US008573976B2

(12) United States Patent
Lecointre et al.

(10) Patent No.: US 8,573,976 B2
(45) Date of Patent: Nov. 5, 2013

(54) INTERACTIVE METHOD FOR HELPING THE DRIVER OF A MOTOR VEHICLE TO ADOPT AN ECONOMICAL DRIVING STYLE AND VEHICLE USING THIS METHOD

(75) Inventors: Bruno Lecointre, Grenoble (FR); Yves Francais, Chatillon (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 708 days.

(21) Appl. No.: 12/663,271

(22) PCT Filed: Jun. 12, 2008

(86) PCT No.: PCT/FR2008/051056
§ 371 (c)(1),
(2), (4) Date: Dec. 21, 2009

(87) PCT Pub. No.: WO2009/004224
PCT Pub. Date: Jan. 8, 2009

(65) Prior Publication Data
US 2010/0178637 A1    Jul. 15, 2010

(30) Foreign Application Priority Data

Jun. 19, 2007    (FR) ...................... 07 55833

(51) Int. Cl.
*G09B 9/04*      (2006.01)
(52) U.S. Cl.
CPC ....................... *G09B 9/04* (2013.01)
USPC ........................................................ 434/29

(58) Field of Classification Search
CPC ........................................................ G09B 9/04
USPC ........................................................ 434/29
See application file for complete search history.

(56) References Cited

U.S. PATENT DOCUMENTS 4,166,382 A    9/1979  Petersen
6,092,021 A    7/2000  Ehlbeck et al.

FOREIGN PATENT DOCUMENTS

DE    10321519 A1    12/2004
DE    102004021013 A1    11/2005
EP    1775501 A    4/2007
FR    2437317 A1    4/1980

OTHER PUBLICATIONS

International Search Report of PCT Appl. No. PCT/FR2008/051056 mailed Apr. 8, 2009.

*Primary Examiner* — Kesha Frisby
(74) *Attorney, Agent, or Firm* — Nicolas E. Seckel

(57) ABSTRACT

The invention relates to an interactive driving assistance method. This method involves selecting a desired driving style, and analyzing (F1) a driver behavior during a detected life situation. From a memory (5), a recommended driver behavior is then selected for the current life situation corresponding to the desired driving style. The behavior of the driver is then compared (F1, 16) with the recommended behavior, and those aspects of the behavior which are considered to be improvable are identified. Finally an audio and/or video information message (7) is issued (F4, F5, 27) inviting the driver to correct his or her behavior on at least the most critical point.

22 Claims, 3 Drawing Sheets

Figure 1:
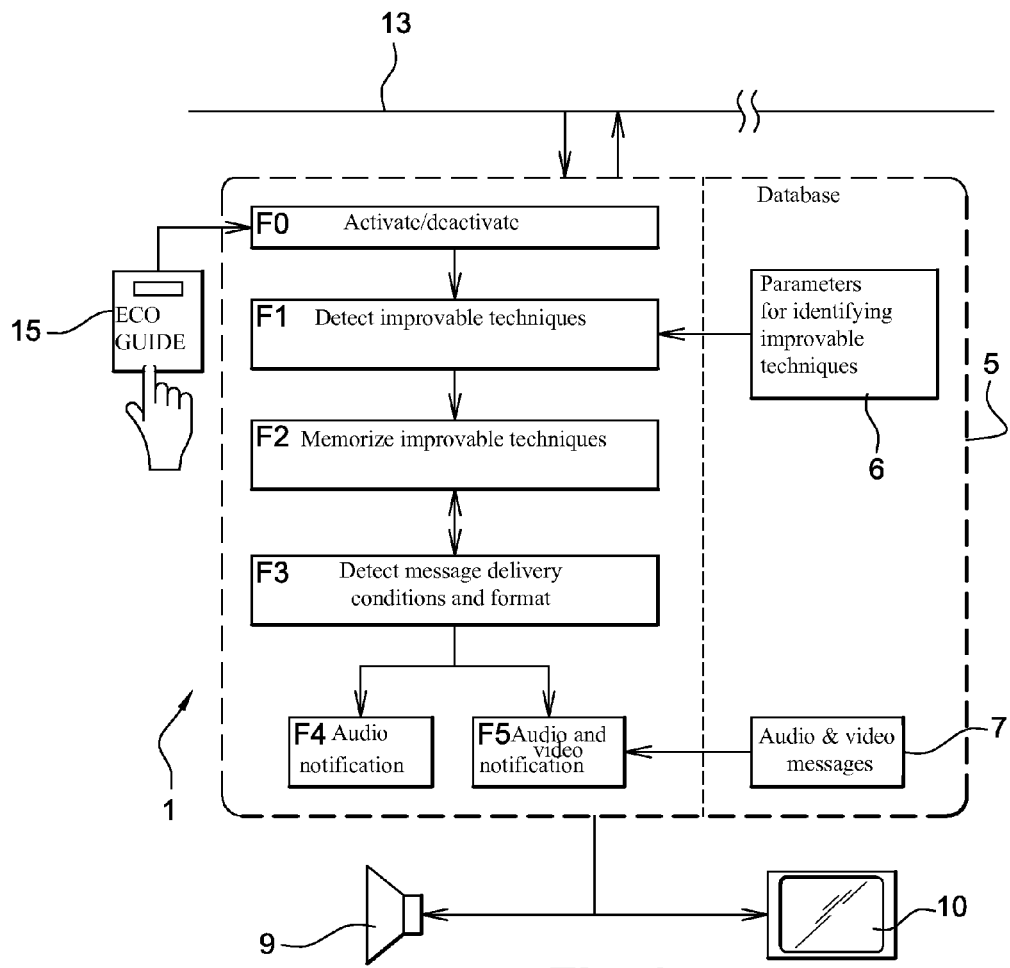

INTERACTIVE METHOD FOR HELPING THE DRIVER OF A MOTOR VEHICLE TO ADOPT AN ECONOMICAL DRIVING STYLE AND VEHICLE USING THIS METHOD

The present invention claims priority from French application 0755833, filed Jun. 19, 2007, the contents of which (description, claims, and drawings) are incorporated herein by reference.

The invention relates to an interactive method for helping the driver of a motor vehicle to adopt a fuel-efficient driving style and a vehicle employing this method. A particular purpose of the invention is to tell the driver which of his driving techniques to improve in order to reduce his vehicle's fuel consumption.

The invention has a particularly advantageous application in the field of combustion engine or hybrid motor vehicles, with manual or automatic transmissions.

Fuel consumption by motor vehicles, along with their greenhouse gas emissions (primarily $CO_2$), is an issue that has been gaining more and more attention, from both public authorities (certification standards, manufacturers setting targets to reduce average emissions to 140 g of $CO_2$/km by 2008, the Kyoto protocol) and consumers (e.g., rising oil prices, the influence of the automotive press). The recent obligation to display the "energy label" at car dealerships also reinforces this pronounced expectation of reducing fuel consumption.

The fuel consumption of a vehicle depends both on the intrinsic performance of the vehicle—such as its engine output, mass and aerodynamics—and how it is used by the driver. The latter can actually increase the fuel consumption of his vehicle if he adopts an aggressive driving style (strong and frequent accelerations) and if he makes heavy use of the comfort features of his vehicle (air conditioning and audio/video systems in particular).

The driver who wants to intentionally practice a fuel-efficient driving style (whether to reduce his pollutant emissions or to reduce his fuel bill) does not have a guide available at this time to fully assist him in this process.

That is, only two systems are currently on the market, which give partial information that may assist the driver, either by displaying instantaneous fuel consumption or by displaying a recommended gear ratio.

The first indicator gives only instantaneous information, and thus does not tell the driver anything about the best approach to adopt both at that time and in the future. Moreover, instantaneous fuel consumption varies from one instant to the next in response to the slightest pressure on the accelerator pedal, the slope of the road, etc., which in practice actually makes this information unusable for the driver. The second indicator gives more information on the techniques to adopt, but only very partial information is provided. None of these systems being marketed tells the driver the most appropriate ways to accelerate or brake.

Moreover, in the state of the art described in patent documents U.S. Pat. No. 4,166,382, FR-2437317, and U.S. Pat. No. 6,092,021, only one-dimensional information is provided (an indicator light, a needle, a recommended gear is displayed).

Therefore, there is a need for an actual assistant that would be capable of analyzing a set of driver actions and proposing appropriate changes, in order to tailor the driving style to a particular purpose, such as a fuel-efficient style making it possible to minimize fuel consumption.

In other words, there is a need for an assistant that can analyze the driver's technique and suggest a more appropriate approach, e.g., to reduce his fuel consumption if applicable.

In accordance with the invention, this goal is achieved with an interactive driving assistance method that comprises the following steps:
  selecting a desired driving style,
  detecting a vehicle scenario,
  analyzing the technique of the driver during this scenario,
  selecting from a memory a recommended driver technique for the scenario, corresponding to the desired driving style,
  comparing said driver technique with the recommended technique, and
  identifying points of technique considered to be improvable and transmitting an audio and/or video message (7) with information inviting the driver to correct his technique on at least the most critical point.

The audio and/or video messages according to the invention are messages describing the technique to adopt in a specific scenario, for example, during prolonged braking, when passing, or at a steady speed. These messages specify when to change gears, how to press down the pedal or when to disengage the clutch, for example.

Thus, in the invention, vehicle scenarios are identified, i.e., temporal sequences of various durations, whereas in the known state-of-the-art methods, the information provided is instantaneous (engine speed and current vehicle speed). Consequently, in the invention, scenarios are detected after the fact, and information is provided subsequently, after the scenario is analyzed, and preferably at a moment when there is no risk of distracting the driver.

The assistant can provide this information in audio form (a vocal message) or in audio and video form (a vocal message accompanied by video animation) if the vehicle has equipment for this. In this case, the video animation is preferably displayed only if the vehicle is stopped, e.g., during a "consultation" by the driver, asking for his driving analysis, e.g., during his last trip—entered in the onboard computer after initializing a trip, for example—so as to not divert his attention.

The assistant is capable of memorizing the improvable techniques during driving, so as to tell the driver the most appropriate techniques when conditions make it possible to give him this message without disrupting his attention. For example, all video messages are blocked when the vehicle is not immobile. In this case, only an audio message will be possible, if the conditions are appropriate.

The assistant can also offer the driver a summary of the most common improvable points.

This assistant is preferably activated at the driver's request (either by a start button or through a menu in the onboard computer) and is deactivated at any time in the same way. However, it could also be activated remotely by a vehicle fleet manager, for example.

In an embodiment, the assistant is a software function that does not require any particular instrumentation. It is integrated into one of the vehicle's calculators and connected to the vehicle communication system (CAN bus) in order to obtain the information used in its operation. It is additionally connected to the audio system (and video, if equipment allows) in order to notify the driver.

However, the assistant according to the invention could also be in the form of an independent electronic circuit connected to the onboard computer.

The invention thus relates to an interactive driving assistance method, characterized in that it comprises the following steps:
  selecting a desired driving style,
  detecting a vehicle scenario, analyzing the technique of the driver during this scenario,
selecting from a memory a recommended driver technique for the current scenario, corresponding to the desired driving style,
comparing said driver technique with the recommended technique, and
identifying points of technique considered to be improvable and transmitting an audio and/or video message (7) with information inviting the driver to correct his technique on at least the most critical point.

According to an implementation, the desired driving style is a style that minimizes fuel consumption.

According to an implementation, the scenario is selected from the following: a deceleration phase with no braking, a deceleration phase with braking, passing, or proceeding at a steady speed.

According to an implementation, the audio and/or video message is transmitted only if the scenario is considered to be stable.

According to an implementation, the improvable technique is memorized in order to enable transmission or retransmission of the message with the corresponding information during a favorable driving situation.

According to an implementation, the video messages are transmitted only when the vehicle is stopped and the driver does not have his foot on the accelerator pedal.

According to an implementation, the driving situation is considered to be stable if the vehicle has been in the same scenario for at least 2s and if the driver has his foot on the accelerator pedal.

According to an implementation, the driving situation is furthermore considered to be unfavorable if the vehicle is turning.

According to an implementation, the observed points of technique are selected from at least two of the following actions: amount of accelerator pedal depression, brake pedal activation, choosing a gear ratio, disengaging the clutch.

According to an implementation, each occurrence of a technique considered to be improvable adds an increment to a counter keeping track of improvable techniques.

According to an implementation, associated with each observed point of technique is a specific point counter, whose count is incremented each time an improvable technique is detected that could be improved by an action addressing this point.

According to an implementation, when the counter that tracks improvable techniques reaches a certain threshold, a message is transmitted with the aim of improving the point whose counter has the highest count, thereby inviting the driver to correct his technique on at least the most critical point.

According to an implementation, the number of occurrences of scenarios is also memorized in order to develop statistics on the frequency of improvable techniques.

According to an implementation, all information from the counters and the statistics is memorized in order to enable a comparison of techniques before and after the transmission of a message.

According to an implementation, the counters are reset to zero at the driver's request, via a button or by selecting options given by an onboard computer.

According to an implementation, the method according to the invention has two levels of deactivation:
 a standby mode in which no messages are transmitted, but analysis of improvable techniques continues, and
 an inactive mode in which all the functions of the assistant are deactivated.

According to an implementation, the method according to the invention comprises the following step:
 distinguishing between the two levels of deactivation by means of a button with three positions, for active/standby/inactive, or
 by means of a push button, where each press of the button causes it to switch from active to standby, from standby to inactive, and from inactive to active, or
 by means of an option on the onboard computer.

According to an implementation, all of the information from the counters, memories, and statistics can be downloaded to a computer not in the vehicle.

According to an implementation, the method according to the invention is constructed so that it cannot be deactivated.

The invention additionally relates to a motor vehicle employing the method according to the invention.

The following description and accompanying figures will make the invention more easily understood. These figures are given only as an illustration, and are in no way an exhaustive representation of the invention. They show:

FIG. 1: a block diagram of the assistant according to the invention;

FIGS. 2-6: logic diagrams of various functions F0-F5 employed by the assistant according to the invention.

Identical elements retain the same reference from one figure to another.

FIG. 1 shows an assistance module 1 according to the invention that employs functions F0-F5 allowing it to analyze the driver's driving and to advise him on the best techniques to use in order to optimize his driving, in particular to limit his fuel consumption.

Function F0 activates and deactivates this assistance module 1. Function F1 analyzes the driver's technique and identifies improvable points of technique. Function F2 memorizes the improvable points of technique that have been identified. Function F3 detects the conditions for delivering the message from the assistant and the type of message to provide (audio or video). Function F4 provides the audio notification, whereas function F5 provides an audio and video notification of the technique to improve.

The assistance module 1 is associated with a database 5 containing the recommended points of technique 6 for a given scenario, as well as audio and video messages 7 associated with each identifiable improvable technique.

The module 1 is connected to an audio system 9, such as vehicle speakers, as well as a video system 10, such as the onboard computer, in order to transmit the messages 7 to the driver.

In addition, the assistance module 1 exchanges data with the vehicle communication system 13, the assistant module 1 extracting information from this system 13 in order to identify the vehicle scenario and analyze points of technique used by the driver.

More precisely, the module 1 is turned on when the driver presses a specific button 15 or takes an action in a graphic interface like the onboard computer, via the function F0.

Figure 2:
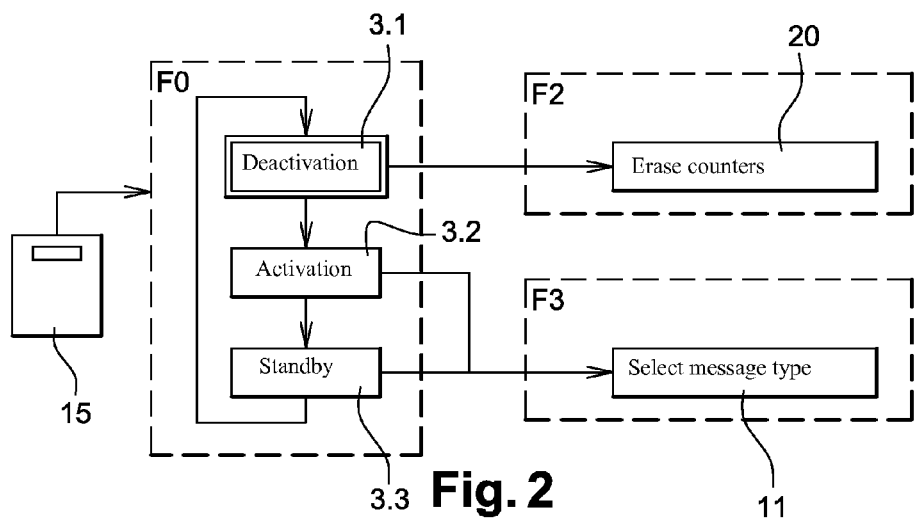

As shown in FIG. 2, the activate 3.2 or standby 3.3 subfunction gives a choice of the type of message (audio and/or video) to be delivered. In addition, the activate 3.2 sub-function allows the driver to select the desired driving style. This driving style defaults to a minimum fuel-consumption driving style. However, there is also the possibility of a driving style that allows a medium level of fuel consumption or one that makes it possible to optimize the speed of the vehicle.

Once the assistant is activated, the function F1 detects the vehicle scenario and the driver's improvable points of technique.

To this end, the function F1 analyzes the driver's actions in real time using information read off the communication system 13, such as accelerator pedal depression, brake pedal activation, the speed of the vehicle, the engine speed, and algorithms 17.1-17.N for detecting improvable techniques.

Figure 3:
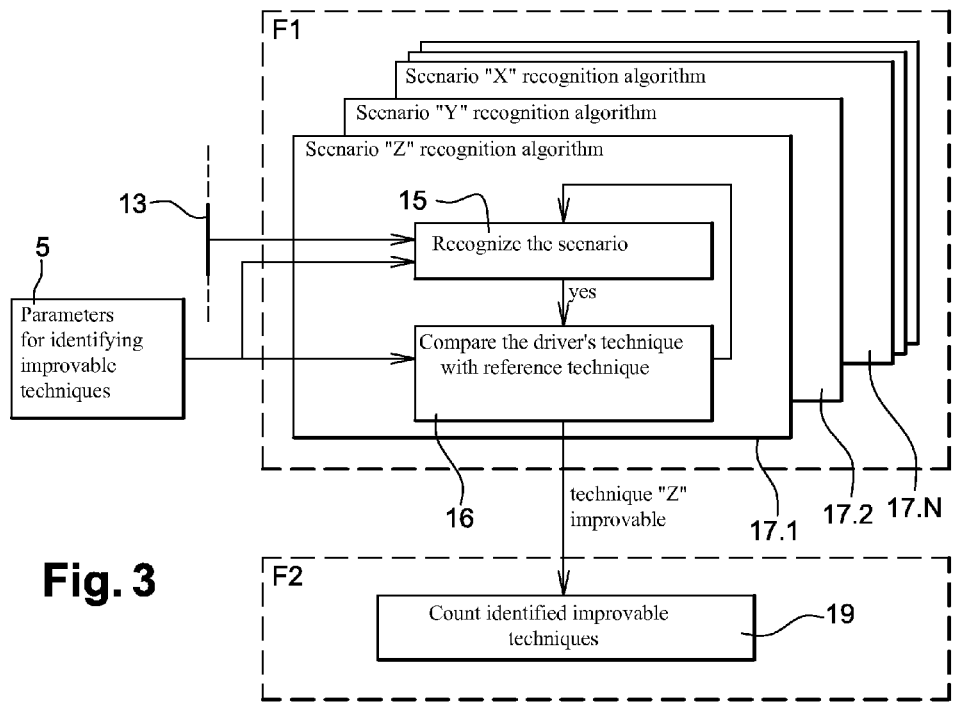

As shown in FIG. 3, each algorithm 17.1-17.N for detecting improvable techniques has two distinct steps.

In a first step 15, the algorithm 17.1-17.N detects a specific scenario X-Z, this scenario X-Z being selected from among the following: a deceleration phase with or without braking, proceeding at a steady speed, passing, or a prolonged acceleration. This scenario is defined by the vehicle parameters read off the communication system 13 in a window of time between 2 and 45s, for example.

In a second step 16, the algorithm 17.1-17.N analyzes the driver's technique for the detected scenario. This driver technique is defined by at least two of the following observed points of technique: amount of accelerator pedal depression, brake pedal activation, choice of gear ratio, clutch disengagement.

The algorithm 17.1-17.N selects from the database 5 a recommended driver technique for the current scenario that corresponds to the desired driving style. If the desired style is the minimal fuel consumption style, the recommended technique is defined by recommended points of technique (that correspond at least to the observed points of technique) selected from among the following: amount of accelerator pedal depression, brake pedal activation, choice of gear ratio, and clutch disengagement, for which vehicle fuel consumption is minimal for the detected scenario.

Next, the algorithm 17.1-17.N compares 16 the points of technique with the corresponding recommended points of technique. Then the algorithm identifies the improvable points of technique, i.e., the points of technique that diverge from the recommended points of technique. And the function F1 tells the function F2 which improvable points of technique were identified, so that the driver is invited to correct his technique on at least the most critical point of technique (the one that diverges most from a recommended point of technique, or the most frequent one).

The moment when an improvable technique is detected is not always an appropriate one for notifying the driver what he can do to improve his fuel consumption. That is, the assistant should not disturb the driver or distract him. If the driver is turning or accelerating, it is preferable to wait for a stable scenario before transmitting the audio and/or video message via the functions F4 and F5.

In an implementation, the function F3 considers the scenario to be stable for audio transmission (audio conditions 22 met) when the vehicle speed has been steady for a certain amount of time, e.g., more than 3s, and when the driver has his foot on the accelerator pedal, but is not turning.

Whereas the function F3 considers the scenario to be stable for video transmission (video conditions 23 met) when the vehicle is immobile and the driver does not have his foot on the accelerator pedal.

While waiting for audio and/or video message transmission conditions to be met, the function F2 uses the sub-function 19 to memorize the improvable points of technique that are identified.

Figure 4:
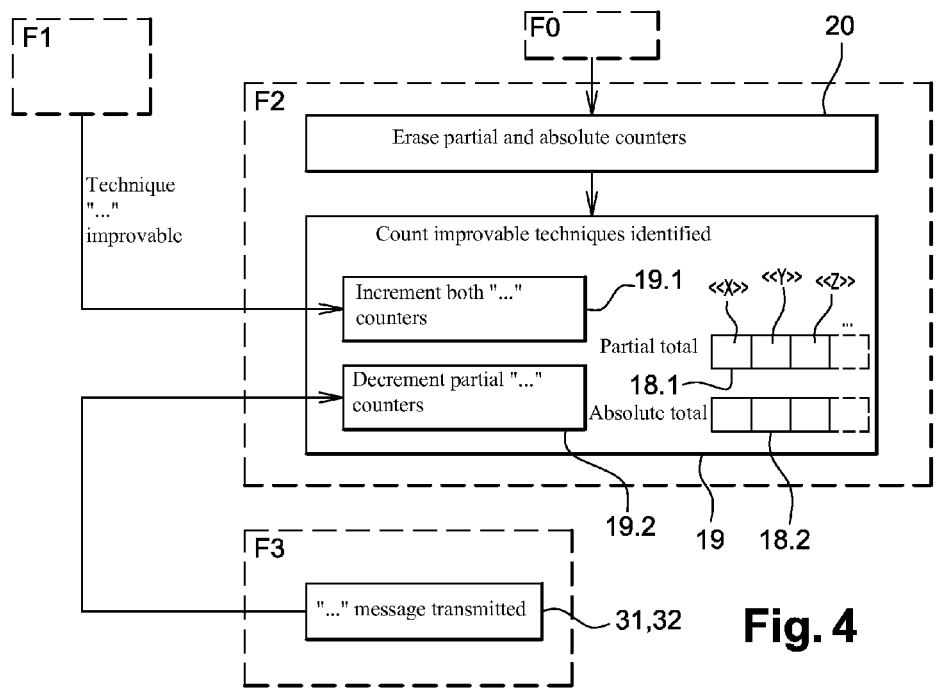

Since the recognition algorithms are always operating as long as the assistant is active, more than one improvable point of technique can be identified before the message 7 is able to be transmitted. The memorization function F2 preferably stores all the improvable points of technique and the scenarios X-Z associated with them, along with their occurrences, using a counter 18.1 as shown in FIG. 4.

If multiple techniques are memorized, the sub-function 25 selects the message to transmit. In an implementation, the sub-function 25 selects the message in decreasing order of occurrences of each improvable technique (from the most to the least frequent). As a variant, the sub-function 25 selects the message that corresponds to the most recent improvable technique.

In an implementation, when one of the counters 18.1, 18.2 keeping track of improvable points of technique reaches a certain threshold, the sub-function 25 selects a message with the aim of improving the point whose counter 18.1, 18.2 has the highest score, thereby inviting the driver to correct his technique on at least the most frequent improvable point of technique.

Figure 5:
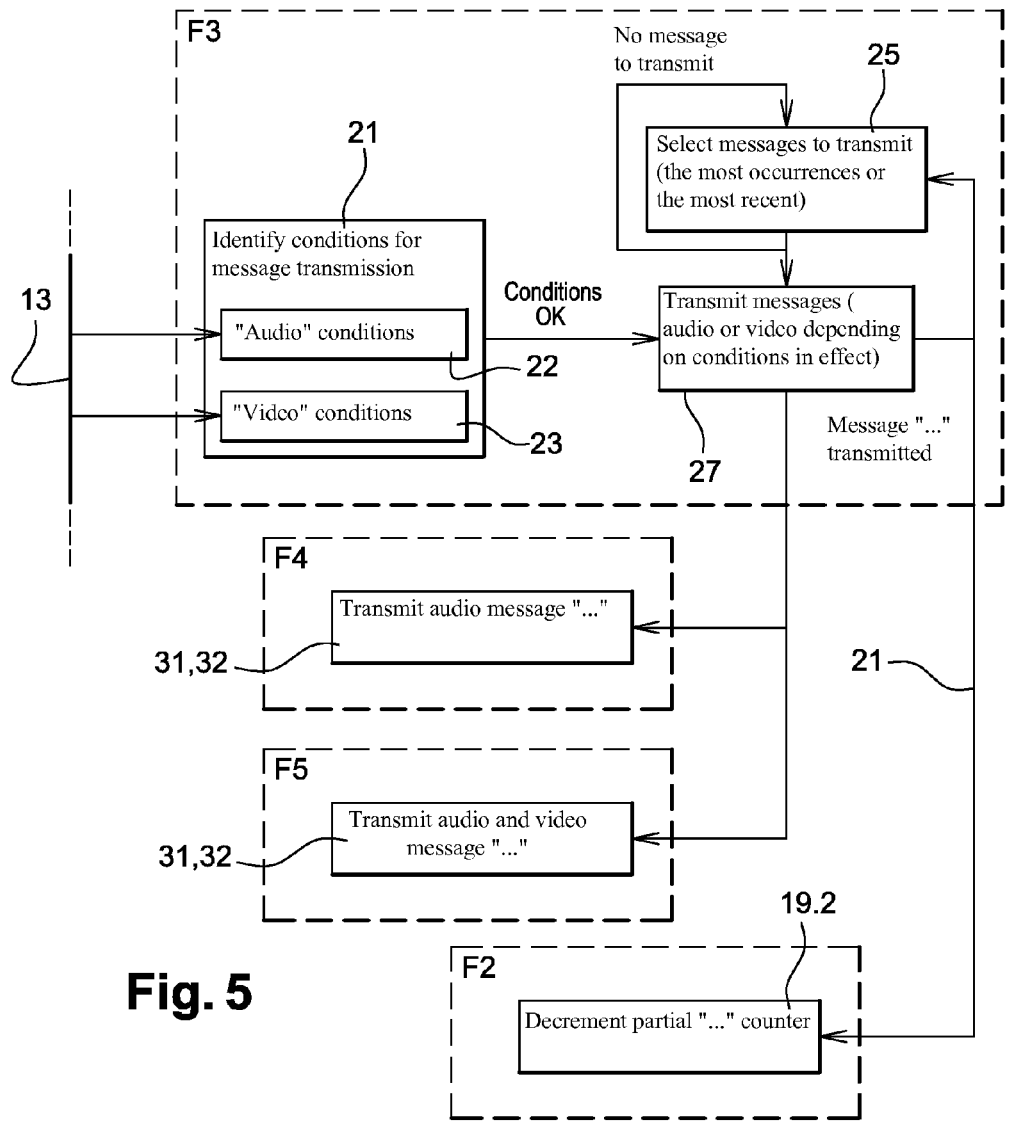

The memorized improvable points of technique and their occurrences are decremented each time the function F3 provides audio or video information telling the driver which technique to adopt. Thus there is a dialogue 21 between the message delivery function F3 and the function F2, as shown in FIG. 5.

In addition, the function F2 can keep all of the points of technique in counters 18.2, with the scenario(s) in which they were observed and their occurrences, particularly so as to develop statistics on the frequency of improvable techniques independently from the messages transmitted. Therefore, the counters 18.2 are not decremented after messages are transmitted.

When the driver requests it (via a menu on the onboard computer) or when he turns off the engine, the module 1 can display a summary of the most common improvable points of technique since the last engine start. These displays are provided in decreasing order of occurrence by the dedicated counters 18.2 in the function F2. If there are too many improvable techniques, the function can indicate just the three most frequent, for example.

In an implementation, all information from the counters 18.1, 18.2 and the statistics is memorized in order to enable a comparison of techniques before and after the transmission of a message 7.

The F2 sub-function 20 is responsible for resetting the counters 18.1, 18.2 to zero. The function F0 orders this reset to zero when the driver presses the button 15 to deactivate the assistant, or activates an onboard computer, or when the engine is restarted.

Figure 6:
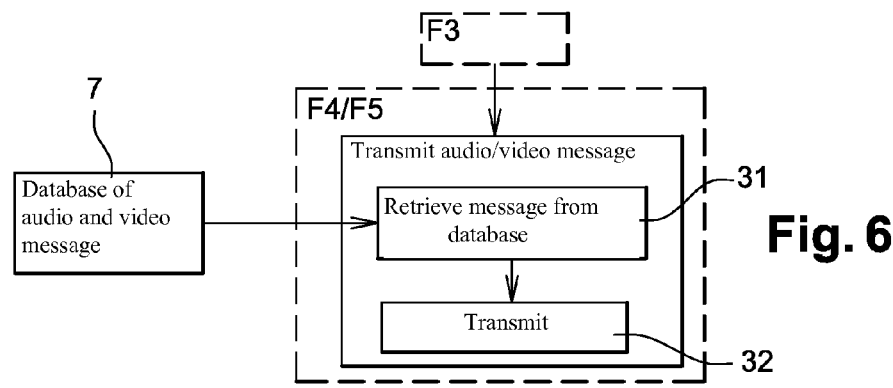

Moreover, as shown in FIG. 4, the function F3 is responsible for transmitting the message(s) 7 to the user. To this end, as shown in FIG. 6, the function F3 tells the functions F4 and F5 which message(s) 7 to transmit. The sub-function 31 then retrieves the messages 7 stored in the database 5. Then the sub-function 32 sends signals to the audio 9 and/or video 10 systems to transmit the messages.

All of the information from the counters, memories, and statistics can be downloaded to a computer not in the vehicle.

The assistant interrupts the sending of messages when the driver deactivates it (via the button 15 or the onboard computer). However, the algorithms for recognition and for counting the improvable techniques can remain active when the assistant is deactivated.

This way, if it is reactivated, the driver has more relevant information, since it includes all of his driving since the last engine startup.

As shown in FIG. 2, two levels of deactivation can also be employed:

a standby mode implemented by the sub-function 3.3, in which the assistant is no longer transmitting any messages, but continues to analyze and count improvable techniques, and a deactivated mode, implemented by the sub-function 3.1, in which all the functions of the assistant are deactivated.

This distinction can be made with the multistate button 15 (either with three positions, for active/standby/inactive, or a push button that changes each time it is pressed from active to standby, from standby to inactive, and from inactive to active), or with an option on the onboard computer.

When the assistant switches into deactivated mode 3.1, the sub-function 20 erases all of the techniques memorized by the function F2.

The messages 7 provided by the assistant help the driver to adopt a more fuel-efficient driving style. In audio format, they explain clearly and succinctly how to work the accelerator, the gearbox, the clutch, and the brakes to optimize fuel consumption. In video format, the audio message is accompanied by a graphic animation indicating the ideal actions to take in a given situation.

In a first example, if the algorithm 17.1 in charge of recognizing the situation "vehicle deceleration" detects this situation and considers that the driver's technique could have been improved, e.g., because he disengaged the clutch at the beginning of the deceleration, the message might be: "To optimize your fuel consumption during deceleration, use your engine brake and downshift when the engine speed falls to approximately 1500 rpm."

In a second example, if the algorithm 17.2 in charge of recognizing the situation "steady vehicle speed between 60 and 70 km/h" detects this situation and considers that the driver's technique could have been improved, e.g. because he is driving in $3^{rd}$ gear, the message might be: "To optimize your fuel consumption, shift to $5^{th}$ gear as soon as possible after reaching 60 km/h."

In a third example, if the algorithm 17.3 in charge of recognizing the situation "vehicle acceleration" detects this situation and considers that the driver's technique could have been improved, e.g., because he is changing gears too late, the message might be: "To optimize your fuel consumption, shift to the next higher gear when the engine speed reaches about 2500 rpm."

The assistant proposed herein makes it possible to give the driver effective and relevant assistance to enable him to optimize his fuel consumption. By analyzing his driving in detail, the assistant provides only advice tailored to the driver. This advice encompasses a set of practices to adopt (how to accelerate, when to change gears by engine speed, when to brake, whether or not to disengage the clutch, etc.).

In contrast to partial indicators like the recommended gear indicator or instantaneous fuel consumption, the assistant presented herein provides a broader range of information covering all of the driver's possible actions (accelerating, braking, changing gears, disengaging the clutch).

The assistant is also interactive and "intelligent", since it analyzes exactly what the driver is doing in order to discern his weaker points and provide him with appropriate advice. It is also capable of determining the most favorable moment to provide this advice so as to not distract him. The format of the message is also tailored to the driving situation.

This assistant can also provide information summarizing the driver's recurring improvable techniques, which is impossible for any "instantaneous" indicator.

This assistant can be disconnected, and it has a standby mode that can continue to analyze his driving if the driver does not want to be disturbed by messages at a particular time, but does want to receive advice on his weak points at a later time.

Lastly, this assistant provides effective advice for optimizing vehicle fuel consumption. The "right" approaches to fuel-efficient driving are not actually well enough known. This assistant can therefore be a great help to drivers concerned about their fuel consumption.

The assistant is also beneficial for fleet vehicles if it is constructed so that it cannot be deactivated. In this case, each driver has to become educated about fuel-efficient driving, and this has an impact on the overall fuel consumption of the fleet, and therefore on the cost of running it. The assistant can therefore be a selling point in the sale of vehicle fleets.

The invention claimed is:

1. Computer-implemented interactive driving assistance method to assist the driver of a vehicle, comprising implementing the following algorithm with a computer in the vehicle:
    selecting from a database stored in a computer memory a desired driving style, wherein said database includes at least one driving style,
    detecting a vehicle scenario by analyzing first data on operation parameters of the vehicle, taken from a communications network of the vehicle,
    analyzing a technique of the driver during this scenario by analyzing second data on operation parameters of the vehicle, taken from the communications network of the vehicle,
    selecting from the database a recommended driver technique for the scenario, corresponding to the desired driving style, wherein said database includes a plurality of different driver behavior characteristics,
    comparing said driver technique with the recommended driver technique, and
    identifying points of technique considered to be improvable, and
    selecting from the database and transmitting an audio and/or video message with information inviting the driver to correct his technique on at least the most critical point.

2. Method according to claim 1, wherein the desired driving style is a driving style that minimizes fuel consumption.

3. Method according to claim 1, wherein the vehicle scenario is selected from the following: a deceleration phase with no braking, a deceleration phase with braking, passing, or proceeding at a steady speed.

4. Method according to claim 1, wherein the audio and/or video message is transmitted only if the vehicle scenario is considered to be stable.

5. Method according to claim 4, wherein the improvable technique is memorized in order to enable transmission or retransmission of the message with the corresponding information during a favorable driving situation.

6. Method according to claim 5, wherein the video messages are transmitted only when the vehicle is stopped and the driver does not have his foot on the accelerator pedal.

7. Method according to claim 4, wherein the driving situation is considered to be stable if the vehicle has been in the same scenario for at least 2s and if the driver has his foot on the accelerator pedal.

8. Method according to claim 7, wherein the driving situation is furthermore considered to be unfavorable if the vehicle is turning.

9. Method according to claim 1, wherein said observed points of technique are selected from at least two of the following actions: accelerator pedal depression, brake pedal activation, choosing a gear ratio, disengaging the clutch.

10. Method according to claim 1, comprising, for each occurrence of a driver technique considered to be improvable, adding an increment to a counter keeping track of improvable techniques.

11. Method according to claim 10, wherein, additionally, associated with each observed point of technique is a specific point counter, the method comprising incrementing a count of the specific point counter each time an improvable technique is detected that could be improved by an action addressing this point of technique.

12. Method according to claim 11, wherein, when the counter keeping tracks improvable techniques reaches a certain threshold, a message is transmitted with the aim of improving the point of technique whose counter has the highest count, thereby inviting the driver to correct his technique on at least the most critical point of technique.

13. Method according to claim 10, wherein the number of occurrences of scenarios is also memorized using another counter in order to develop statistics on the frequency of improvable techniques.

14. Method according to claim 13, wherein all information from the counters and the statistics is memorized in order to enable a comparison of techniques before and after the transmission of a message.

15. Method according to claim 13, wherein the counters are reset to zero at the driver's request, via a button or by selecting options given by an onboard computer.

16. Method according to claim 10, wherein all of the information from counters, memories, and statistics can be downloaded to a computer not in the vehicle.

17. Method according to claim 1, comprising two levels of deactivation:
   a standby mode in which no messages are transmitted but analysis of improvable techniques continues, and
   an inactive mode in which all the functions of the assistant are deactivated.

18. Method according to claim 17, comprising:
   distinguishing between the two levels of deactivation by means of a button with three positions, for active/standby/inactive, or
   by means of a push button, where each press of the button causes it to switch from active to standby, from standby to inactive, and from inactive to active, or
   by means of an option on the onboard computer.

19. Method according to claim 1, which is constructed so that it cannot be deactivated.

20. Method according to claim 1, wherein the database for selecting the desired driving style includes a plurality of different driving styles.

21. Method according to claim 20, wherein the desired driving style is selected from minimum fuel-consumption driving style, medium level fuel consumption driving style, and vehicle speed optimization driving style.

22. Motor vehicle employing the method defined according to claim 1.

* * * * *